(12) United States Patent
Malhotra et al.

(10) Patent No.: US 9,019,337 B2
(45) Date of Patent: Apr. 28, 2015

(54) SYSTEM AND METHOD FOR MANAGING A PRESENTATION

(71) Applicant: Avaya Inc., Basking Ridge, NJ (US)

(72) Inventors: Honey Malhotra, Bangalore (IN); Ramanujan S. Kashi, Bangalore (IN)

(73) Assignee: Avaya Inc., Basking Ridge, NJ (US)

(*) Notice: Subject to any disclaimer, the term of this patent is extended or adjusted under 35 U.S.C. 154(b) by 216 days.

(21) Appl. No.: 13/773,404

(22) Filed: Feb. 21, 2013

(65) Prior Publication Data
US 2014/0232814 A1 Aug. 21, 2014

(51) Int. Cl.
*H04N 7/14* (2006.01)
*H04N 7/15* (2006.01)

(52) U.S. Cl.
CPC ........................... *H04N 7/15* (2013.01)

(58) Field of Classification Search
CPC ......... H04N 7/15; H04N 7/147; H04N 7/141; H04N 7/152; H04N 7/142
USPC ................................. 348/14.01, 14.07–14.09
See application file for complete search history.

(56) References Cited

U.S. PATENT DOCUMENTS

| | | | |
|---|---|---|---|
| 2009/0079813 A1* | 3/2009 | Hildreth | 348/14.03 |
| 2010/0118202 A1* | 5/2010 | Yoshida | 348/581 |
| 2012/0081611 A1* | 4/2012 | Tan et al. | 348/584 |

OTHER PUBLICATIONS

"Immersive HD Conferencing and Collaboration by DVE Telepresense.Digital Video Enterprises." (DVE). Downloaded from http://www.dvetelepresence.com/ on Feb. 21, 2013. 2 pgs.
"Immersive 3-D Video Conferencing: Challenges, Concepts, and Implementations." DVE Immersion Room. Downloaded from http://www.dvetelepresence.com/room/home.htm on Feb. 21, 2013. 2 pgs.

* cited by examiner

*Primary Examiner* — Quoc D Tran
(74) *Attorney, Agent, or Firm* — Sheridan Ross P.C.

(57) ABSTRACT

The system and method capture an image of a presenter of a presentation. The image of the presenter may be a still image or a video stream. In one embodiment, the image of the presenter has the background removed. An image of the presentation is captured. The image of the presentation may be a still image or a video stream. A transition, such as a gesture or movement of the presenter is detected. In response to the detection of the transition, an image of the presenter is superimposed on the image of the presentation to create a combined image. Alternatively, in response to the transition, the image of the presenter is removed from the presentation. The combined image or the image of the presentation with the image of the presenter removed is then sent to participants viewing the presentation.

20 Claims, 5 Drawing Sheets

SYSTEM AND METHOD FOR MANAGING A PRESENTATION

TECHNICAL FIELD

The systems and methods relate to multimedia systems and in particular to managing multimedia presentations.

BACKGROUND

In todays web conferencing systems, the experience that is provided to participants viewing a web conference remotely typically consists of a view of the presenter of the web conference in one window along with a separate view of the presentation in a different window. This view is different from the view of a participant who is actually attending the web conference. The natural experience of the participant who is attending the web conference live is that the video of the presenter and the presentation are part of the same experience. Trying to reproduce this immersive experience to a remote audience is still a challenge with today's technology. The goal is to provide the remote participant a similar experience that a participant attending the web conference in person would have.

SUMMARY

Systems and methods are provided to solve these and other problems and disadvantages of the prior art. The system and method capture an image of a presenter of a presentation. The image of the presenter may be a still image or a video stream. In one embodiment, the image of the presenter has the background removed. An image of the presentation is captured. The image of the presentation may be a still image or a video stream. A transition, such as a gesture or movement of the presenter is detected. In response to the detection of the transition, an image of the presenter is superimposed on the image of the presentation to create a combined image. Alternatively, in response to the transition, the image of the presenter is removed from the presentation. The combined image or the image of the presentation with the image of the presenter removed is then sent to participants viewing the presentation.

DETAILED DESCRIPTION

Figure 1:
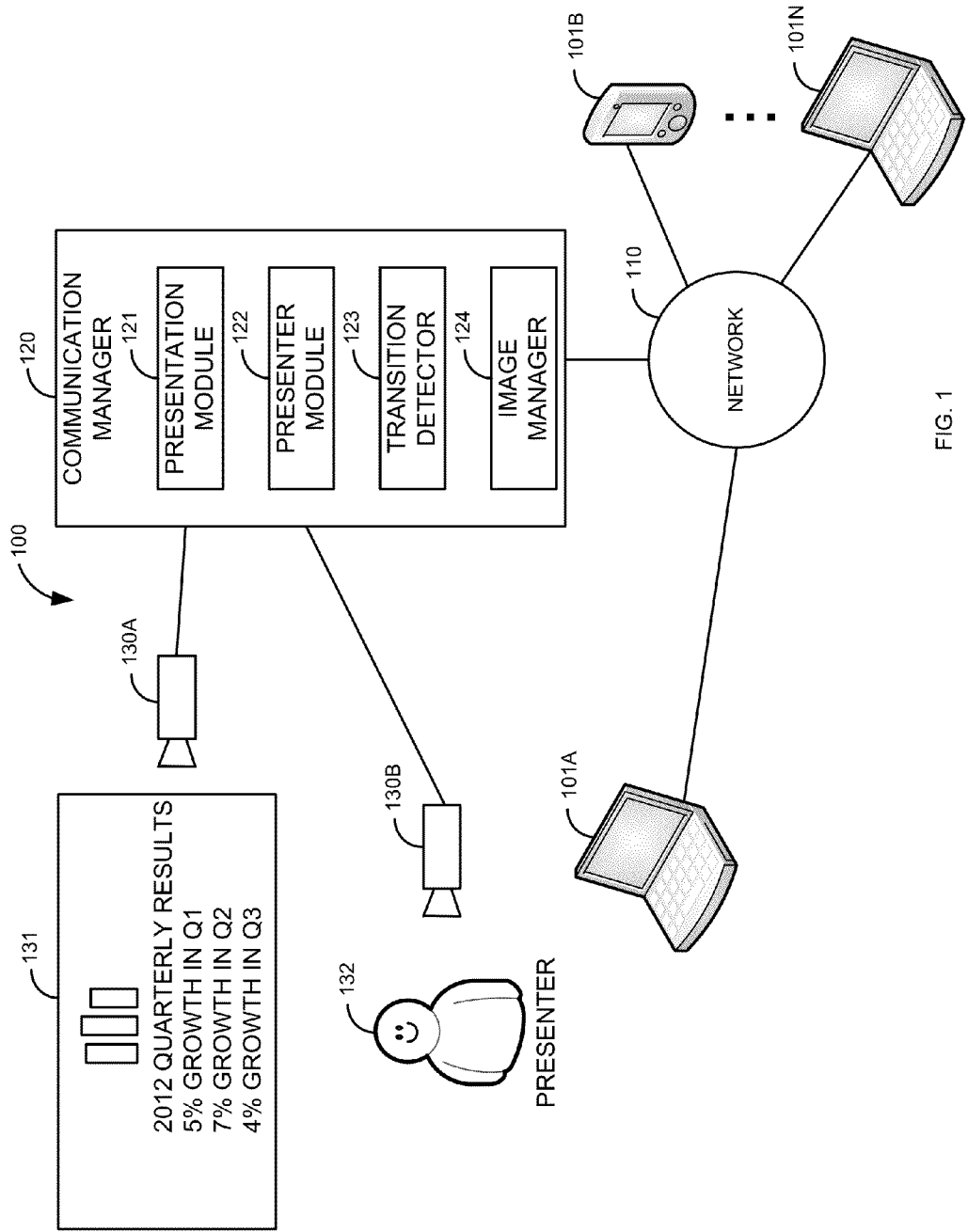
FIG. 1 is a block diagram of a first illustrative system for managing a presentation.

FIG. 1 is a block diagram of a first illustrative system 100 for managing a presentation. The first illustrative system 100 comprises communication devices 101A-101N, a network 110, a communication manager 120, and video cameras 130A-130B. FIG. 1 also shows an image of a presentation 131 and a presenter 132.

The communication devices 101A-101N may be any device that can communicate on the network 110, such as a Personal Computer (PC), a telephone, a video system, a cellular telephone, a Personal Digital Assistant (PDA), a tablet device, a notebook device, and the like. As shown in FIG. 1, any number of communication devices 101A-101N may be connected to network 110, including only a single communication device 101. In addition, the communication devices 101A-101N may be directly connected to the communication manager 120.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Real-time Transport Protocol (RTP), H.323, H.264, H.263, H.261, Integrated Services Digital Network (ISDN), and the like.

The communication manager 120 can be any hardware/software that can handle communications, such as a Private Branch Exchange (PBX), a video switch, a video server, a multi-media switch, a router, a central office switch, a bridge, a video mixer, and the like. The communication manager 120 further comprises a presentation module 121, a presenter module 122, a transition detector 123, and an image manager 124. The presentation module 121 can be any hardware/software that can process a presentation, such a video module, a personal computer, a communication device 101, an image processor, a Digital Signaling Processor (DSP), and/or the like. The presentation module 121 is shown as part of communication manager 120, however, in some embodiments, the presentation module 121 may operate external to the communication manager 120.

The presenter module 122 can be any hardware/software that can manage an image or video stream, such as a video server, a video switch, an image processor, a Digital Signaling Processor (DSP), a communication device 101, a personal computer, and/or the like. The presenter module 122 is shown as part of the communication manager 120, however, in some embodiments, the presentation module 121 may operate external to the communication manager 120. The presenter module 122 may be connected to the video camera 130B.

The transition detector 123 can be any hardware/software that can process an image, a video stream, and/or an audio stream for transitions. A transition can be any type of event/action that can occur in an image, video stream, and/or audio stream. For example, a transition can be where a presenter of a presentation walks toward an audience, where the presenter walks away from the audience, where the presenter walks away from a display of the presentation, where the presenter walks toward the display of the presentation, where the presenter points to the presentation, where the presenter points to a specific area of the presentation, a detection of a laser pointer pointing to the presentation, where the presenter makes a gesture, an action by a second presenter, where the presenter walks off a stage, where the presenter walks on the stage, and/or the like. In other embodiments, a transition can be based on events/actions not associated with the presenter, such as a person in the audience raising their hand, a person in the audience standing up, a person in the audience leaving the presentation, a person in the audience yelling, a person in the audience gesturing, a person in the audience speaking a word or phrase, music being played, a noise, and/or the like.

The image manager 124 can be any hardware/software that can process images and/or video streams such as a Digital Signaling Processor (DSP), an image processor, a video bridge, a video switch, a video server, and/or the like. The image manager 124 may bridge, merge, and/or superimpose video images and/or streams. The image manager 124 is shown in communication manager 120. However, in embodiments, the image manager 124 may reside in a communication device 101 of a participant that is viewing the presentation remotely.

The video cameras 130A-130B can be any hardware/software that can capture an image or video. The video cameras 130A-130B are show directly connecting to the communication manager 120. However, the video cameras 130A-130B may connect to the communication manager 120 via the network 110.

The presenter module 122 captures an image of the presenter of the presentation. The image of the presenter may be a still image of the presenter. Alternatively the image of the presenter may be video stream of the presenter (e.g., a live video stream). Capturing the image of the presenter can be accomplished in various ways, such as the image of the presenter being captured via the video camera 130B, the image of the presenter being captured via a plurality of video cameras 130, the image of the presenter being captured via a camera, and/or the like.

The presenter module 122 captures the image of the presentation 131. This can be accomplished in different ways. The image of the presentation 131 may be a still image of the presentation 131. Alternatively the image of the presentation 131 may be video stream of the presentation (e.g., a live video stream). The image of the presentation 131 may be captured via the video camera 130A. Alternatively, the image of the presentation 131 may be captured directly from a communication device 101 that is being used by the presenter 132 (e.g., the communication device 101A).

The transition detector 123 detects a transition related to the presentation. As discussed above, a transition can be any event/action that is related to the presentation. The types of transitions that are detected by the transition detector 123 can be defined by the presenter 132 and/or an administrator in a configuration file or user profile. The configuration file or user profile can contain information about how different kinds of transitions are handled by the image manager 124.

Figure 2:
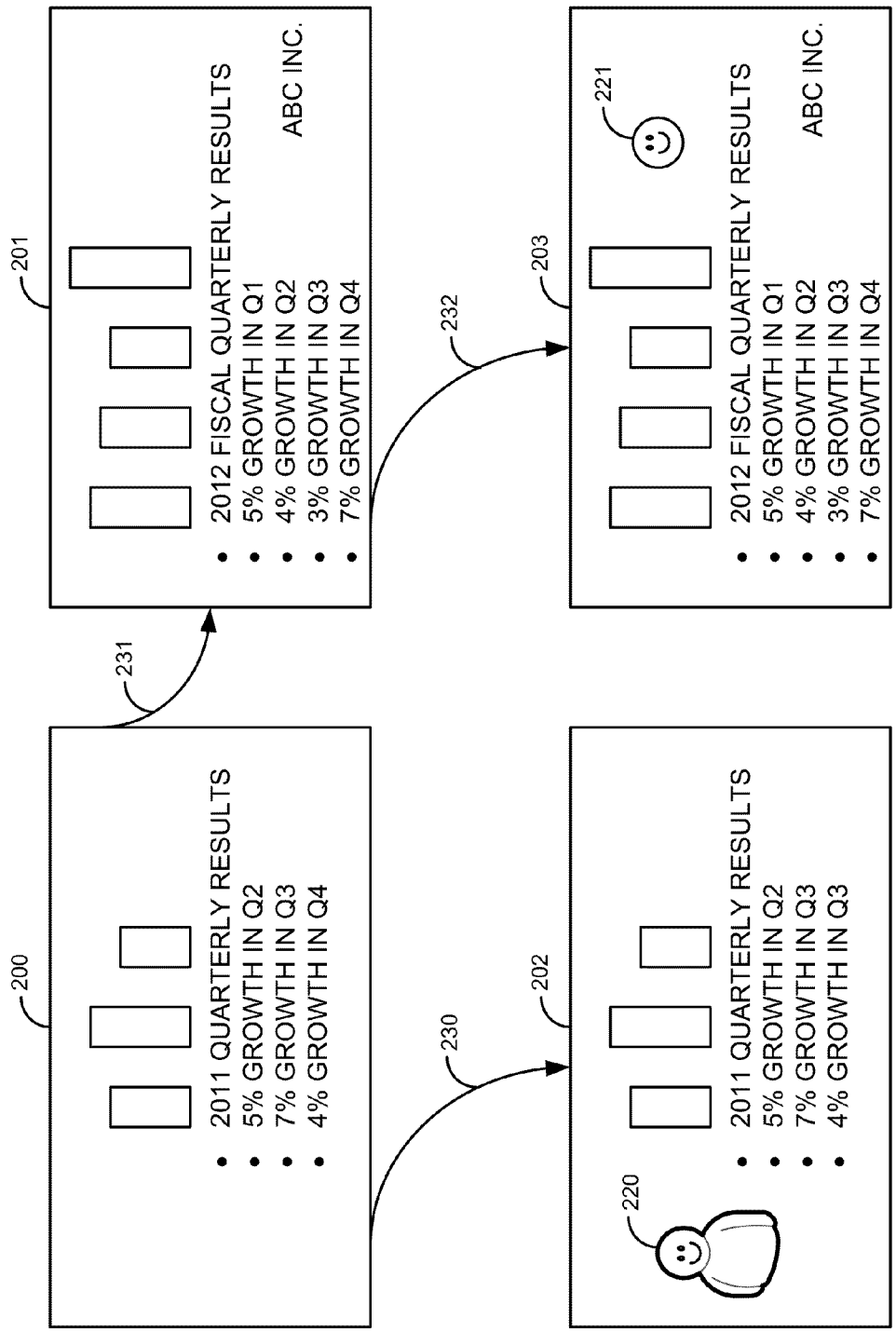
FIG. 2 is a diagram of various ways a user can view a presentation.
Figure 3:
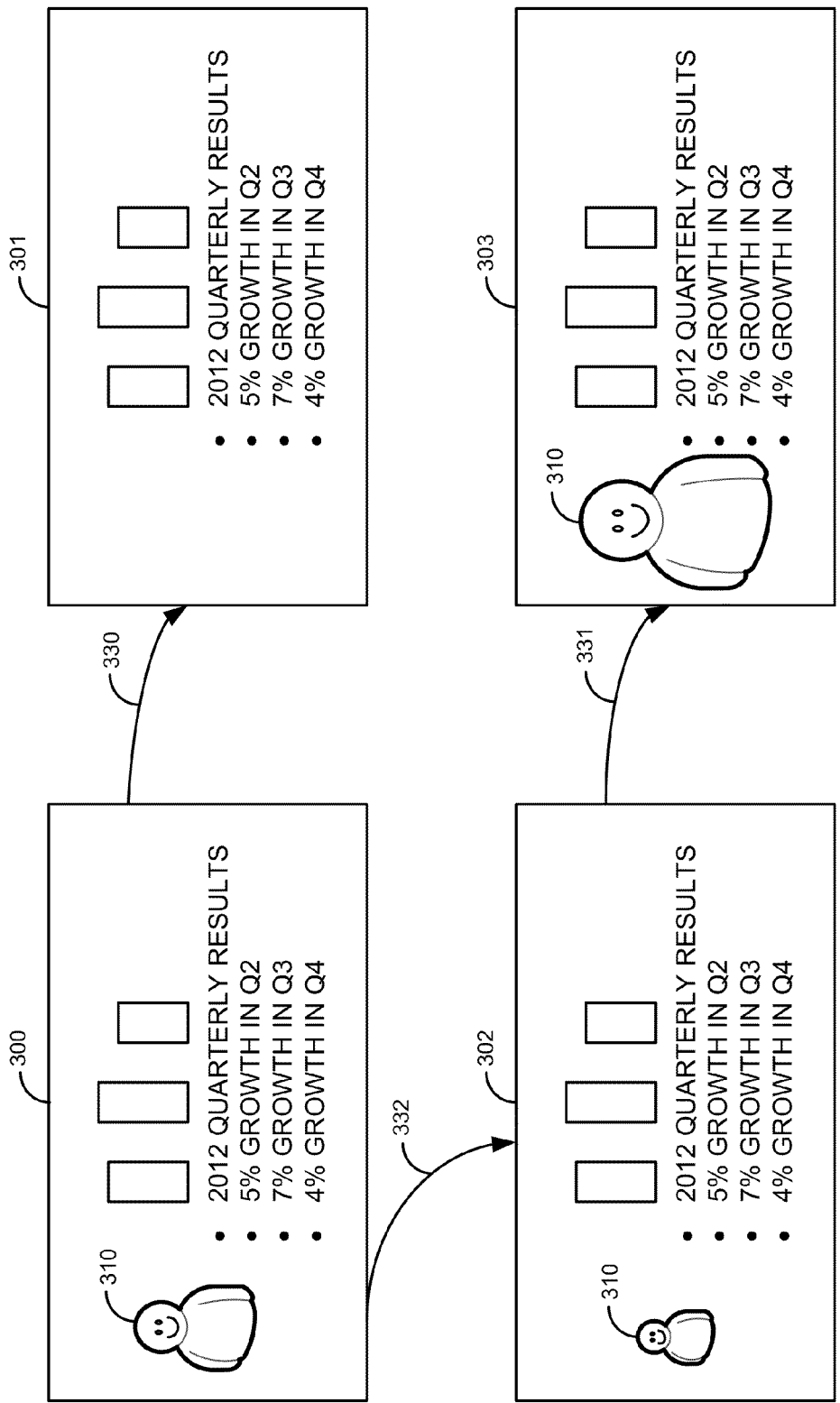
FIG. 3 is a diagram of various ways a user can view a presentation.

In response to the transition detector 123 detecting the transition related to the presentation, the image manager 124 may respond in various ways. For example, the image manager 124 can superimpose the image of the presenter on the image of the presentation 131 (i.e., as shown in FIGS. 2-3) into a combined image. The combined image may be an image, a video stream, or a combination of both. Alternatively, the image manager 124 can remove the superimposed image of the presenter from the image of the presentation 131.

The combined image is then sent to users of the presentation (or the image of the presentation with the image of the presenter removed) for display. For example, users at communication devices 101B-101N. In an alternative embodiment, the image of the presentation and the image of the presenter may be sent to a communication device 101 that contains the image manager 124. The image manager 124 in the communication device 101 can superimpose the image of the presenter on the image of the presentation in the communication device 101. The combined image may then be displayed to a user.

In one embodiment, the superimposed image of the presenter is an image or video stream where the background of the image or video stream has been removed by the image manager 124. The image manager 124 can superimpose the image of the presenter with the background removed in various ways, such as showing a full image of the presenter, showing a full video image of the presenter, showing a facial image of the presenter, showing a facial video image of the presenter, showing an image of the hands of the presenter, showing a video image of the hands of the presenter, showing a partial video image of the presenter, showing a partial image of the presenter, and/or the like.

To illustrate, consider the following examples. The presenter 132 starts presenting a presentation to an audience in a lecture hall. The video camera 130B sends a video stream of the presenter to the presenter module 122. The presenter module 122 captures the video steam of the presenter. Communication device 101A generates a slide show for presentation by the presenter 132. The presenter 132 starts the presentation by displaying the image of the presentation 131 via communication device 101A. The image of the presentation 131 is sent by communication device 101A to the presentation module 121, which captures the image of the presentation 131. The presenter 132 walks toward the audience in the lecture hall (a transition). The transition detector 123 detects the presenter 132 walking toward the audience. In response to the transition detector 123 detecting the presenter 132 walking toward the audience, the image manager 124 superimposes the video stream of the presenter (with the background removed) on the image of the presentation 131 into a combined image. In this example, the combined image is a video stream that shows the movement of the presenter (via the superimposed video stream of the presenter) superimposed on the image of the presentation 131.

The presenter 132 walks away from the audience (a transition). The transition detector 123 detects the presenter 132 walking away from the audience. In response to the transition detector 123 detecting the presenter 132 walking away from the audience, the image manager 124 removes the superimposed video stream of the presenter from the image of the presentation 131.

In an embodiment, the image manager 124 can superimpose the image of the presenter on the image of the presentation 131 by determining an empty space within the image of the presentation 131. An empty space may be an area in the image of the presentation 131 that contains no text or images, an area that contains a limited amount of images and/or text, an area that contains a specific type of text, images, or information, and/or the like. The image manager 124 can superimpose the image of the presenter in an area associated with the empty space. An area associated with the empty space may be an area next to (e.g., above and below) the empty space, an area larger than the empty space, an area within the empty space (i.e. based on the size of the empty space), a combination of these, and/or the like.

Alternatively, the presenter 132 may define a specific place on each slide to superimpose the image of the presenter so that the superimposed image of the presenter is always displayed in the sample place on each slide. For example, the presenter 132 may defined the same area on the left hand side of the presentation. This way, the superimposed image of the presenter consistently stays in the same place as the presenter 132 goes through the presentation.

If the image of the presentation 131 changes, the image manager 124 can determine a new empty space within the changed image of the presentation 131. Based on a determined size of the new empty space within the changed image of the presentation 131, the image manager 124 can determine a new size of the superimposed image of the presenter. The image manager 124 superimposes the image of the presenter in an area associated with the new empty space. This may mean that the superimposed image of the presenter may change position as slides in a presentation change.

In an embodiment, superimposing the image of the presenter comprises increasing or decreasing the size of the superimposed image of the presenter based a transition. For example, the size of the superimposed image of the presenter may increase as the presenter 132 walks toward the audience and the size of the superimposed image of the presenter may decrease as the presenter walks away from the audience.

In addition, the presenter 132 may annotate the presentation using one or more gestures. For example, a line gesture may cause a line to be superimposed on the image of the presentation or the combined image. Which gestures are defined for annotation can be defined in a configuration file. The gestures that are defined for annotation can be different from those defined for transitions.

In another embodiment, as the presenter 132 of the presentation walks toward the audience, the resolution of the image of the presentation 131 can be decreased. This has several advantages. By decreasing the resolution of the image of the presentation 131, the remote viewer of the presentation will focus on the image of the presenter. In addition, by decreasing the resolution of the image of the presentation 131, bandwidth is conserved.

Alternatively, the resolution of the image of the presentation 131 can be increased as the presenter 132 walks away from the audience. The resolution of the image of the presentation 131 can also be increased based on the presenter 132 pointing to the presentation or walking toward the presentation.

FIG. 2 is a diagram of various ways a user (typically a remote user) can view a presentation. FIG. 2 comprises windows 200-203. The windows 200-203 may be a window in a display or may be a full display. Window 200 shows an first exemplarily image of the presentation. Window 201 shows a second exemplarily image of the presentation. Window 202 shows a first exemplarily combined image. Window 203 shows a second exemplarily combined image.

Windows 200-201 are a view of two separate slides (images) of a presentation that a presenter 132 gives to an audience. The presenter 132 starts the presentation by the presenting the first slide (window 200). The presenter 132 makes a defined gesture, such as waiving his hand. The presenter 132 has defined the transition of waiving his hand as the transition for superimposing the image of the presenter on the image of the presentation. The transition detector 123 detects the presenter 132 waiving his hand. The image manager 124 determines that there is an empty space on the left hand side of the window 200. The image manager 124 superimposes 230 the image (background removed in this example) of the presenter 220 on the image of the presentation to produce the combined image in the window 202. If the image of the presenter is a video stream, the end user will see a video stream of the presenter that move as the presenter 132 is moving.

The presenter 132 changes 231 the image of the presentation by switching to a new slide (image of the presentation). This results in the window 201. Based on changing the image of the presentation 232, the image manager 124 determines a new empty space (in the upper right hand corner of the window 201) in the changed presentation. The image manager 124 superimposes 232 the image of the presenter 221 in the upper right hand corner of window 201 to produce the combined image in the window 203.

In this example, the image of the presenter 220 is changed to only show an image of the face of the presenter 221 in the window 203. This may be based on the determined size of the empty space. In this example, the area in the upper right hand corner of window 201 is smaller than the area in the left hand side of window 200. As one of skill in the art could envision, the size of the superimposed image of the presenter 220/221 may increase in size between slides. Alternatively, different portions of the image of the presenter 220/221 may be displayed based on various types of configurations. For example, a full image of the presenter may be displayed in one slide and in the next slide only the face of the presenter may be displayed. In another embodiment, in next slide, only the hands of the presenter are displayed; for example, if the presenter 132 is giving a portion of the presentation in sign language.

In another embodiment, the presentation may be presented by multiple presenters 132. As a different presenter 132 speaks, the superimposed image of the presenter 220/221 may change to reflect which presenter is speaking. Alternatively, both presenters 132 may be displayed in different areas of the image of the presentation. This can be based on the empty space(s) in the image of the presentation. The portion of the image of the multiple presenters may also be different. For example, the first presenter's image may be a full image of the first presenter and the second presenter's image may only be a facial image of the second presenter. The current speaker out of the multiple speakers may be further identified by changing a color of the image of the presenter.

FIG. 3 is a diagram of various ways a user (typically a remote user) can view a presentation. FIG. 3 comprises windows 300-303. Windows 300 and 302-303 are exemplarily combined images/video streams. Window 301 is an image of the presentation where the superimposed image of the presenter 310 has been removed. As the presenter 132 flows through the presentation, the windows 300-302 show exemplarily views that a user may see.

During the presentation, the image of the presenter 310 is superimposed (based on a transition) on the image of the presentation to produce the combined image in window 300. In one embodiment, the superimposed image of the presenter may be superimposed based on the start of the presentation (a transition). Based on a transition 332, such as the presenter 132 walking away the audience, the image of the presenter 310 is decreased as shown in window 302. Based on a second transition, 331, such as the presenter 132 walking toward the audience, the image of the presenter 310 increases in size as shown in window 303. Based on a third transition 330, such as the presenter 132 walking off stage, the image of the presenter 310 is removed from window 301.

Figure 4:
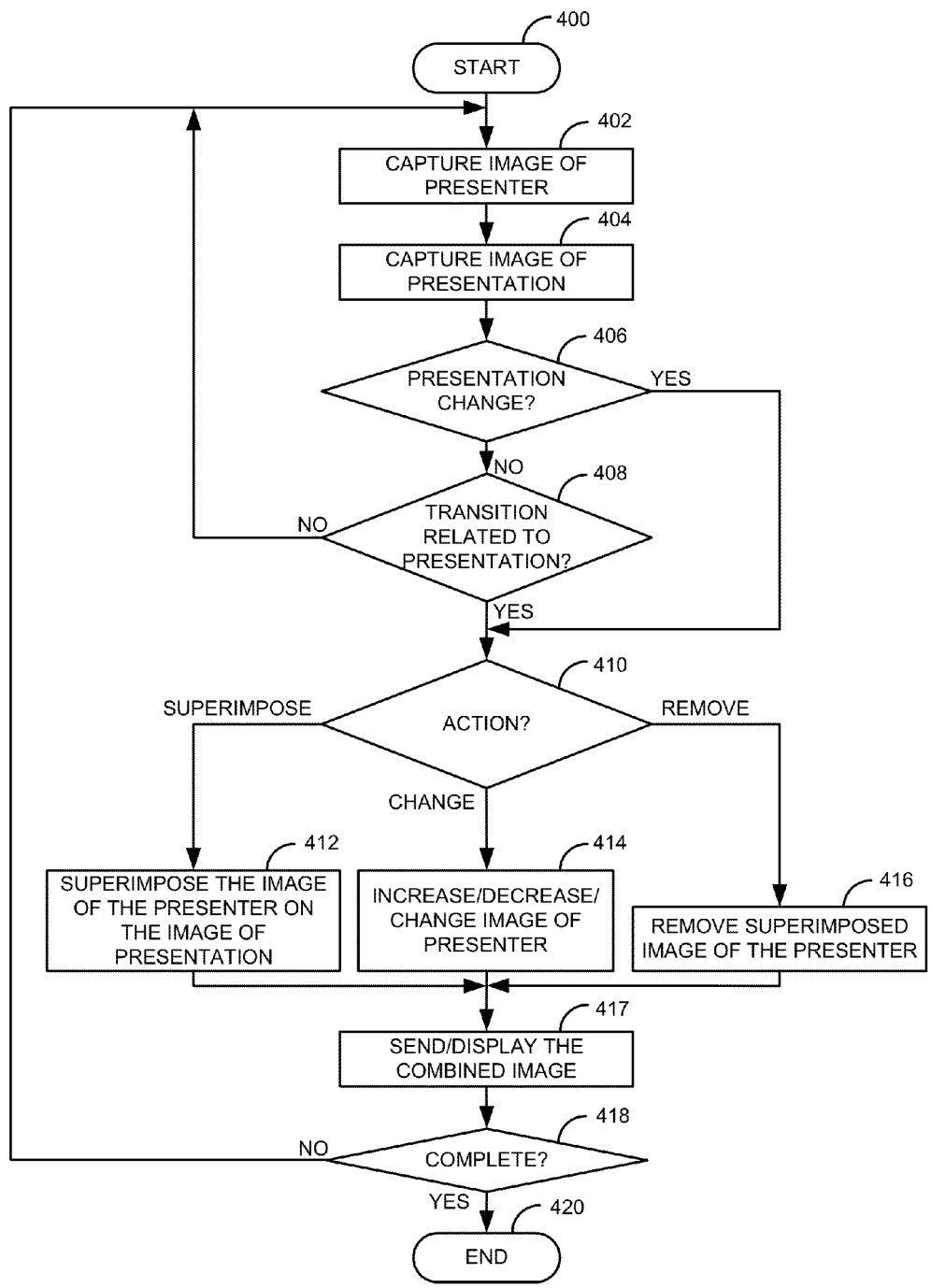
FIG. 4 is a flow diagram of a method for managing a presentation.
Figure 5:
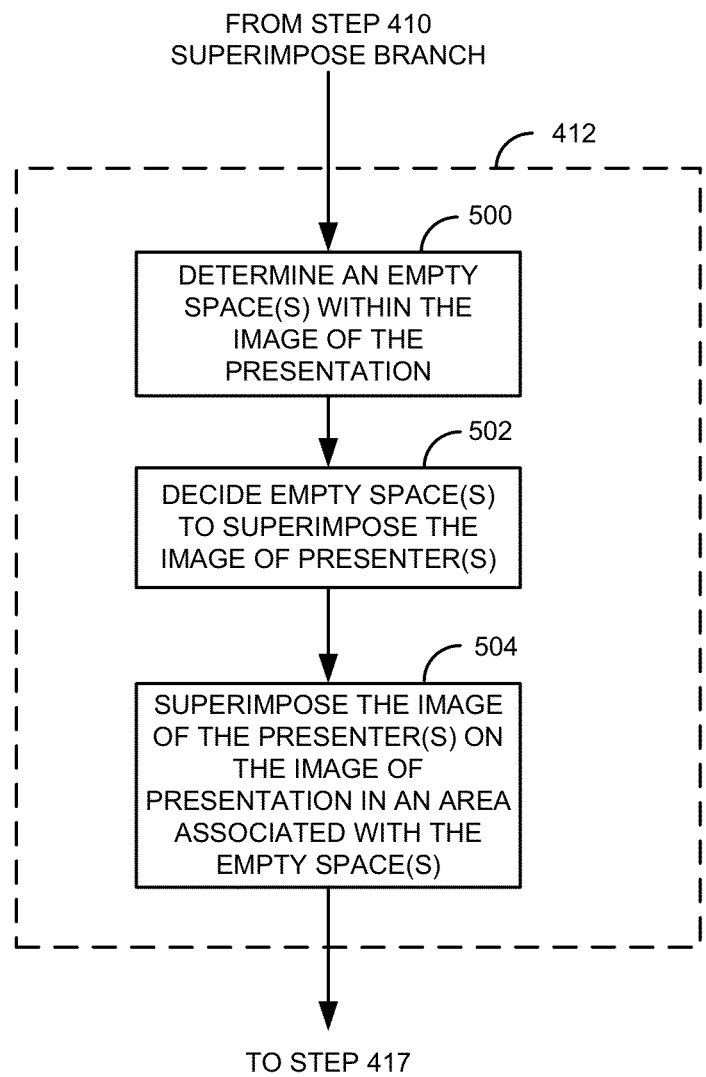
FIG. 5 is a flow diagram of a method for identifying empty spaces in an image of a presentation.

FIG. 4 is a flow diagram of a method for managing a presentation. The process starts in step 400. Illustratively, the communication devices 101A-101N, the communication manager 120, the presentation module 121, the presenter module 122, the transition detector 123, the image manager 124, and the video cameras 130A-130B are stored-program-controlled entities, such as a computer or processor, which performs the method of FIGS. 4-5 and the processes described herein by executing program instructions stored in a tangible computer readable storage medium, such as a memory or disk. Although the methods described in FIGS. 4-5 are shown in a specific order, one of skill in the art would recognize that the steps in FIGS. 4-5 may be implemented in different orders and/or be implemented in a multi-threaded environment (e.g., steps 402 and 404). Moreover, various steps may be omitted or added based on implementation.

The image of the presenter is captured in step 402. The image of the presentation is captured in step 404. The process determines in step 406 if the image of presentation has changed. If the image of the presentation has changed in step 406, the process goes to step 410. Otherwise, if the image of the presentation has not changed in step 406, the process determines in step 408 if a transition related to the presentation has been detected in step 408. If a transition related to the presentation has not been detected in step 408, the process goes to step 402.

Otherwise, if a transition related to the presentation has been detected in step 408, the process determines in step 410 what action to take. If the action is to superimpose in step 410, the process superimposes 412 the image of the presenter on the image of the presentation. If the action is to change, the process increases, decreases, or changes 414 the image of the presenter. If the action is to remove in step 410, the process removes 416 the superimposed image of the presenter from the image of the presentation. The result of steps 412, 414, and 416 all flow to step 417.

The process sends/displays 417 the combined image to users of the presentation or displays/sends the image of the presentation with the superimposed image of the presenter removed. In step 418, the process determines if the process is complete. If the process is not complete in step 418, the process goes to step 402. Otherwise, if the process is complete in step 418, the process ends 420.

FIG. 5 is a flow diagram of a method for identifying empty spaces in an image of a presentation. The process described in FIG. 5 is a detailed view of an exemplarily embodiment of step 412 in FIG. 4. If the action in step 410 is to superimpose, the process determines 500 an empty space within the image of the presentation. The process decides 502 empty space(s) to superimpose the image of the presenter(s). The empty space(s) that are decided to superimpose the image of the presenter(s) can be based on a variety of things, such as the size of the empty space, the location of the empty space, the height of the empty space, the width of the empty space, a combination of these, and/or the like. The image of the presenter(s) is superimposed 504 on the image of the presentation in an area associated with the empty space. The image of the presenter that is superimposed may be sized based on how large or small the empty space is. The process then goes to step 417.

To illustrate, consider the following examples. If there are two presenters, the process may superimpose the image of the two presenters in two different areas associated with the empty spaces (or the same empty space) within the image of the presentation. Alternatively, the process may superimpose different parts of the image of a single presenter in areas associated with different empty spaces within the image of the presentation. For example, if the presenter is presenting using sign language, an image of the face of the presenter may be displayed in one empty space and the hands (or mid section) of the presenter may be displayed in a different empty space.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing a presentation comprising:
   capturing an image of a presenter of the presentation;
   capturing an image of the presentation;
   detecting a transition related to the presentation; and
   in response to detecting the transition related to the presentation, determining an empty space within the image of the presentation;
   superimposing the image of the presenter onto the empty space within the image of the presentation into a combined image.

2. The method of claim 1, wherein the superimposed image of the presenter is a video stream with a background removed and the combined image is a video stream.

3. The method of claim 1, wherein superimposing the image of the presenter further comprises increasing or decreasing a size of the superimposed image of the presenter based on the presenter walking toward an audience or walking away from the audience.

4. The method of claim 1, wherein the superimposed image of the presenter comprises at least one of:
   a full image of the presenter;
   a full video image of the presenter;
   a facial image of the presenter;
   a facial video image of the presenter;
   an image of the hands of the presenter;
   a video image of the hands of the presenter;
   a partial video image of the presenter; and
   a partial image of the presenter.

5. The method of claim 1, wherein a size of the superimposed image of the presenter is determined based on a size of the empty space within the image of the presentation.

6. The method of claim 1, wherein the image of the presentation changes and further comprising:
   determining a new empty space within the changed image of the presentation;
   determining a new size of the superimposed image of the presenter based on a size of the new empty space within the changed image of the presentation; and
   superimposing the image of the presenter in an area associated with the new empty space within the changed presentation.

7. The method of claim 1, wherein the presenter comprises a plurality of presenters and wherein superimposing the image of the presenter comprises superimposing images of the plurality of presenters into the combined presentation.

8. The method of claim 1, wherein the presenter comprises a plurality of presenters and wherein superimposing the image of the presenter comprises superimposing an image of one of the plurality of presenters based on one of the plurality of presenters speaking.

9. The method of claim 1, wherein the transition is at least one of the following:
   where the presenter walks toward an audience;
   where the presenter walks away from the audience;
   where the presenter walks away from a display of the presentation;
   where the presenter walks toward the display of the presentation;
   where the presenter points to the presentation;
   where the presenter points to a specific area of the presentation;
   where the presenter makes a gesture;
   where the presenter walks off a stage;
   where the presenter walks on the stage;
   an action of a second presenter; and
   an action by a person in the audience.

10. The method of claim 1, further comprising: in response to detecting a second transition related to the presentation, removing the superimposed image of the presenter from the image of the presentation and wherein the transition is a gesture of the presenter that has been defined in a configuration file.

11. The method of claim 1, further comprising at least one of:
   decreasing the resolution of the image of the presentation when the presenter walks toward an audience;
   increasing the resolution of the image of the presentation when the presenter walks away from the audience;
   increasing the resolution of the image of the presentation when the presenter points to the presentation; and
   increasing the resolution of the image of the presentation when the presenter walks toward the presentation.

12. A system for managing a presentation comprising:
   a presentation module configured to capture an image of a presenter of the presentation;
   a presenter module configured to capture an image of the presentation;
   a transition detector configured to detect a transition related to the presentation; and
   an image manager configured to determine an empty space within the image of the presentation and superimpose the image of the presenter onto the empty space within the image of the presentation into a combined image in response to detecting the transition related to the presentation.

13. The system of claim 12, wherein superimposing the image of the presenter further comprises increasing or decreasing a size of the superimposed image of the presenter based on the presenter walking toward an audience or walking away from the audience.

14. The system of claim 12, wherein the superimposed image of the presenter comprises at least one of:
   a full image of the presenter;
   a full video image of the presenter;
   a facial image of the presenter;
   a facial video image of the presenter;
   an image of the hands of the presenter;
   a video image of the hands of the presenter;
   a partial video image of the presenter; and
   a partial image of the presenter.

15. The system of claim 12, wherein the transition detector is configured to detect that the image of the presentation has changed and the image manager is further configured to determine a new empty space within the changed image of the presentation, determine a new size of the superimposed image of the presenter based on a size of the new empty space within the changed image of the presentation, and superimpose the image of the presenter in an area associated with the new empty space within the changed presentation.

16. The system of claim 12, wherein the transition is at least one of the following:
   where the presenter walks toward an audience;
   where the presenter walks away from the audience;
   where the presenter walks away from a display of the presentation;
   where the presenter walks toward the display of the presentation;
   where the presenter points to the presentation;
   where the presenter points to a specific area of the presentation;
   where the presenter makes a gesture;
   where the presenter walks off a stage;
   where the presenter walks on the stage;
   an action of a second presenter; and
   an action by a person in the audience.

17. The system of claim 12, wherein the image manager is further configured to: in response to detecting a second transition related to the presentation, remove the superimposed image of the presenter from the image of the presentation and wherein the transition is a gesture of the presenter that has been defined in a configuration file.

18. A non-transitory computer readable medium having stored thereon instructions that cause a processor to execute a method, the method comprising:
   instructions to capture an image of a presenter of the presentation;
   instructions to capture an image of the presentation;
   instructions to detect a transition related to the presentation; and
   in response to detecting the transition related to the presentation, instructions to determine an empty space within the image of the presentation; and
   instructions to superimpose the image of the presenter onto the empty space within the image of the presentation into a combined image.

19. The non-transitory computer readable medium of claim 18, wherein superimposing the image of the presenter further comprises increasing or decreasing a size of the superimposed image of the presenter based on the presenter walking toward an audience or walking away from the audience.

20. The non-transitory computer readable medium of claim 18, wherein a size of the superimposed image of the presenter is determined based on a size of the empty space within the image of the presentation.

* * * * *